United States Patent Office 3,449,269
Patented June 10, 1969

3,449,269
FORMATE AND FORMAMIDE BLOWING AGENTS FOR POLYLACTAMS
Thomas J. Hyde, Woodbury, N.J., assignor to E. I. du Pont de Nemours and Company, Wilmington, Del., a corporation of Delaware
No Drawing. Filed June 29, 1966, Ser. No. 561,414
Int. Cl. C08g 53/10
U.S. Cl. 260—2.5                        18 Claims

ABSTRACT OF THE DISCLOSURE

The promoted anionic polymerization of lactams to foamed polylactams by utilizing certain formate and formamide blowing agents.

---

The present invention relates to a process for manufacturing foamed polylactams and, more particularly, to an anionic polymerization process for making foamed polylactams using certain formate and formamide blowing agents for foaming the lactams.

The anionic polymerization of lactams, especially ε-caprolactam, has attracted considerable attention within recent years because plastic articles can be made rapidly thereby without the necessity for using injection molding techniques on previously prepared polylactam at temperatures above its melting point. Using rapid polymerization techniques, foamed articles of any size can be formed by injecting a mixture of a lactam, a catalyst, i.e., a lactam-base salt, a cocatalyst, i.e., a polymerization promoter, and a blowing agent, into a mold and heating the mixture below the melting point of the polylactam until polymerization takes place. A number of different blowing agents have been used to prepare foamed polylactams with varying degrees of effectiveness. During simultaneous polymerization and foaming of polylactam, many chemical blowing agents decompose or volatilize too soon and too rapidly under polymerization conditions to make the process commercially feasible and an unsatisfactory product is produced. On the other hand, some chemical blowing agents fail to decompose or volatilize sufficiently under polymerization conditions before solidification of the lactam polymerization mixture occurs. Then too, some blowing agents decompose to produce toxic products that retard polymerization or have a detrimental effect on the properties of the foamed polylactam. Therefore, a need exists for blowing agents that can be employed in the anionic polymerization of lactams that do not adversely affect the anionic polymerization process and produce polylactams having a fine uniform cell structure and low bulk density.

It has now been discovered that foamed polylactams can be produced by heating a polymerization mixture of a lactam base salt, a cocatalyst, and a blowing agent to a temperature above the melting point of the lactam but below the melting point of the resulting polylactam, thereby substantially simultaneously polymerizing and foaming the lactam. The improvement resides in using as blowing agent formates and formamides having the formula:

$$R-X-\overset{O}{\underset{\|}{C}}-H$$

wherein

X is O or

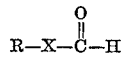

and
R represents at least one of the group consisting of:
(a) an aromatic radical having 1 to 3 rings, preferably 1;

(b) 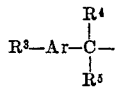

wherein Ar is an aromatic radical having 1 to 3 rings, preferably 1, $R^4$ and $R^5$ are hydrogen, alkyl having 1 to 20 carbon atoms, an aromatic radical having up to 7 carbon atoms and $R^3$ is hydrogen and

wherein the free valence is joined to another

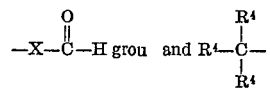

(c) a tertiary alkyl having 4 to 20 carbon atoms, with the tertiary carbon bonded to X;
(d) a divalent alkylene having 4 to 20 carbon atoms and having at least 4 linear carbon atoms between valence bonds, the free valence being joined to another

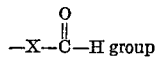

(e) $R^6CH=CHCH_3$— wherein $R^6$ is hydrogen, alkyl having 1 to 20 carbon atoms, and

wherein the free valence is joined to another

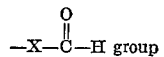

and $R_4$ and $R_5$ have the same meaning as indicated above and
$R_1$ represents at least one of the group consisting of hydrogen, heterocyclic having 5 to 20 carbon atoms and 1 to 3 nitrogens as the hetero atoms, alkyl having 1 to 20 carbon atoms, alicyclic having 4 to 30 carbon atoms, aromatic having 1 to 3 rings, preferably 1,

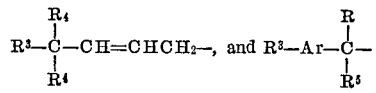

provided however, that when X is O it is bonded to one of the groups defined in (a), (b) or (c); and
when X is

it is bonded to at least one of the groups defined in (a), (b), (c), (d) and (e) with the proviso that when

is bonded to groups (c), (d) or (e), $R^1$ is hydrogen, aromatic having 1 to 3 rings, preferably 1,

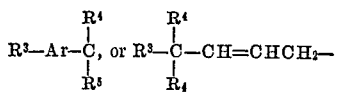

Ar, $R^3$, $R^4$ and $R^5$ have the same meaning as indicated above. Aromatic radicals having from 1 to 3, and preferably 1 aromatic ring are represented by R and are bonded to the 0 or

in the above formula. The aromatic rings may be either fused, as in naphthalene, or connected by single bonds, as in biphenyl. Aromatic radicals that have been found to be particularly suitable as substituents are, for example, phenyl, tolyl, xylyl, etc. In addition, the aromatic radical may be a polyvalent arylene having 1 to 3 aromatic rings, preferably containing not more than 2 rings. Some suitable representative examples of polyvalent arylene radicals that are used in the invention are the following:

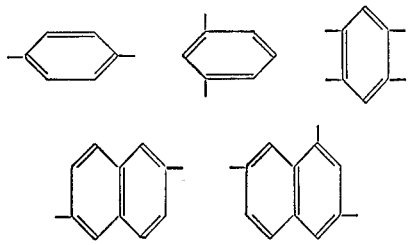

The substituent bonded to X and represented as R in the formula listed above can also be a substituted benzyl radical having the structure

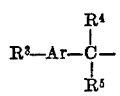

wherein Ar represents an aromatic radical having 1 to 3 rings, preferably 1, as described above, and $R^4$ and $R^5$ are hydrogen, an alkyl having 1 to 20 carbon atoms, an aromatic radical having up to 7 carbon atoms, and $R^3$ is hydrogen or

Representative alkyl groups are methyl, propyl, hexyl, octyl, decyl, tridecyl, hexadecyl, and eicosyl.

Tertiary alkyl groups represented as R in the above formula that can be bonded to X contain from 4 to 20 carbon atoms, and preferably from 4 to 14 carbon atoms. Representative tertiary alkyl groups that have been found to be suitable are, for example, $$-(CH_3)_2C(CH_2)_{14}C(CH_3)_2-$$

$$-(CH_3)_2C-(CH_2)_{10}-C(CH_3)_2-$$

and $$-(CH_3)_2C(CH_2)_4C(CH_3)_2-$$

When X in the above formula is

R can represent a divalent alkylene having 4 to 20 carbon atoms, preferably 6 to 14 having at least 4 linear carbon atoms between valence bonds. Divalent alkylene is meant to include divalent cycloalkylene such as

Representative divalent alkylene radicals that are employed are, for example, decamethylene, tetramethylene, tridecamethylene, pentamethylene, octadecamethylene, $-(CH_2)_{20}-$,

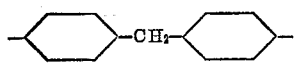

and

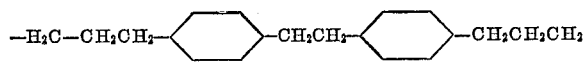

Allylic groups having 3 to 23 carbon atoms can be joined to the nitrogen in the moiety

in order to form unsaturated aliphatic formamides. By an allylic group is meant the structure C=C—C— in which any or all of the carbon atoms can be further substituted.

In the formamide compounds wherein X represents

$R^1$ is hydrogen, alkyl having 1 to 20 carbon atoms, or a heterocyclic ring containing 1 to 3 nitrogen atoms and having 5 to 20 carbon atoms. In general, the heterocyclic compound is a 4 to 7 membered ring, preferably 5 to 6, and contains 1 to 3 double bonds. Specific representative radicals are, for example, imidazole, pyrazole, benzimidazole, 1,3,4-benzotriazole, and dihydropyrazine. $R^1$ can also represent an alicyclic radical having 4 to 30 carbon atoms. In some instances $R^1$ represents an aromatic radical having 1 to 3 rings, preferably 1. As illustrated above $R^1$ represents radicals having the formula

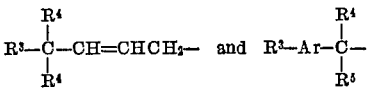

wherein the symbols $R^3$, $R^4$, $R^5$ and Ar have the same meaning given hereinabove.

It can be seen from the above, and the examples that follow, that substituents on the hereinbefore mentioned basic structures (i.e., R and $R^1$) which structures are bonded to the formate or formamide group, can vary considerably and said substituents can represent almost any radical that does not seriously interfere with the anionic polymerization process. For example, active hydrogen constituents retard the polymerization of lactam because they compete with the lactam for the alkali metal ion. However, the degree of retardation depends on the activity of the hydrogen and some active hydrogen can be present provided the quantity of basic catalyst is increased to compensate for the active hydrogen.

Formates are made by conventional procedures described in, for example, Kirk-Othmer "Encyclopedia of Chemical Technology," vol. 5, pp. 776–817, Interscience (1950).

Formamides are made by conventional procedures described in, for example, Kirk-Othmer, "Encyclopedia of Chemical Technology," 2nd Ed., vol. 2, pp. 66–76, Interscience 1963.

The quantity of the formate or formamide blowing agent used in the process of the present invention depends on the density desired in the foamed product. In general, the amount of blowing agent used ranges between about 0.05% to about 2% of the weight of lactam being polymerized, and preferably from about 0.1 to 1%.

The polymerization process of this invention is effective in producting high molecular weight foamed polylactams. Generally, the anionic polymerization process can be started at temperatures above the melting point of the lactam but below the melting point of the resulting polylactam. In general, this starting temperature range is from about 80° C. to 215° C., particularly from about 100° C. to about 200° C. ε-Caprolactam is readily polymerized by the process of this invention starting at temperatures between 100° C. and 160° C., with 150° C. being a convenient starting temperature.

Any lactam can be used in the process of this invention. However, it is preferable to employ lactams having from 3 to 12 carbon atoms in the lactam ring, and most preferably, 6 to 12 carbon atoms. When lactams having from 3 to 5 carbon atoms are polymerized, the preferred temperature is from about room temperature, i.e., 25° C. to 80° C. Representative lactams that can be employed either alone or mixed are, for example, ε-caprolactam, enantholactam, capylolactam, and laurolactam.

The lactam-base salts used as catalysts in the process of this invention are prepared by the reaction of bases with a lactam. Generally, ε-caprolactam is used for the preparation of such anionic catalysts; but if desired, the anionic catalysts can be prepared from other lactams, preferably, for convenience, the lactam that is to be polymerized is used. The base employed to form the anionic catalyst or lactam-base salt is an alkali metal, an alkaline earth metal, or a basic derivative of one of these metals such as hydroxide, alkoxide, hydride, alkyl, aryl, amide, or organic acid salt. All of these bases are of the type which are strong enough to convert the lactam to its iminium salt. Thus, sodium hydroxide, potassium hydroxide, lithium hydroxide, magnesium hydroxide, calcium hydroxide, strontium hydroxide, lithium hydride, sodium hydride, sodium methoxide, sodium methyl, sodium ethyl, sodium phenyl, sodium naphthyl, sodamide, are, for example, suitable bases for the preparation of the anionic catalyst.

The anionic catalyst, that is, the lactam-base salt, is prepared by heating a lactam with a base at a temperature between about 25° C. and 225° C. The base can be added to the total lactam which is to be polymerized, or alternatively, to a portion of the lactam which is to be polymerized and this portion, containing the anionic catalyst is subsequently added to the lactam to be polymerized. The time required for preparing the lactam-base salt varies from a few seconds to several hours and depends upon a number of variables, for example, the strength of the base employed, the proportion added, and the temperature chosen. Preferably, the lactam and the base should be substantially anhydrous. Generally, the amount of the base charged is between about 0.1 mole percent and about 5.0 mole percent of the total lactam used, and the preferred range is between about 0.3 mole percent and about 1.5 mole percent.

Any cocatalyst compound or polymerization promoter capable of causing polymerization of the lactam above the melting point of the monomer but below the melting point of the polymer, can be used in this invention. The cocatalysts are usually derived from organic and inorganic acids of particular types. Effective cocatalysts are acyl compounds, i.e., compounds having the structure C=X wherein X can be sulfur, oxygen or nitrogen, the unsatisfied valences of carbon being substituted with any organic radical, preferably not having more than 20 carbon atoms. Representative of the acyl compounds that can be used as cocatalysts, are, for example, acyl halides, anhydrides, imides, organic isocyanates, ketenes, alpha-halogenated ketones, N-acetyl caprolactam, and substituted ureas. Specifically desirable are N-substituted imides having the structural formula

wherein A is a radical such as carbonyl, thiocarbonyl, imino, sulfonyl, phosphinyl, and thiophosphinyl radicals, B is a radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tertamino, acylamido, N-substituted carbamyl, N-substituted carbamido, alkoxy and ether groups, A and B, or A and R, together can form a ring system through a divalent linking group, and any free valence bond of the A and B radicals can be hydrogen or R, except when A is directly linked thereto.

Other acyl cocatalyst compounds that are suitable for use in the present invention are further described in British Patent 863,859 published Mar. 29, 1961, British Patent 872,328 published July 5, 1961, British Patent 842,576 published July 27, 1960, Australian Patent 218,129 published Jan. 16, 1958, Australian Patent 228,445 published May 8, 1958, Australian Patent 231,825 published Oct. 22, 1959, German Patent 1,067,-591 published Oct. 22, 1959, German Patent 1,067,587 published Oct. 22, 1959, Belgian Patent 592,979 published Jan. 16, 1961.

Other cocatalysts that are particularly suitable are aromatic carbonate esters having at least one carbocyclic aromatic group attached to the carbonate (e.g., the polycarbonate of 4,4′-dihydroxydiphenyl-2,2-propane) disclosed in U.S. Patent 3,207,713. Still another desirable cocatalyst is 2,2,4-trimethyl-3-hydroxy-3-pentenoic acid β-lactone, disclosed in U.S. Patent 3,214,415. Acyl-bis heterocyclic compounds (e.g., sebacoyl-bis pyrazole) disclosed in U.S. Patent 3,206,418 are also desirable cocatalysts. The triazine derivatives disclosed in application Ser. No. 135,791 filed Sept. 5, 1961, and assigned to the assignee of the persent application, is still another desirable class of cocatalysts, also diphenyl carbamyl heterocyclic compounds dsiclosed in application Ser. No. 274,803 filed Apr. 22, 1963, are suitable cocatalysts that may be employed in this invention.

Some additional representative examples of particular cocatalysts which can be used in the process of this invention are: 2,2,4,4-tetramethylcyclobutanedione; 2/1 adduct of ε-caprolactam and 2,4-toluenediisocyanate; 2/1 adduct of ε-caprolactam and hexamethylenediisocyanate; 2/1 adduct of ε-caprolactam and 4,4′-methylenebis(phenylisocyanate); 3/1 adduct of ε-caprolactam and 1,4-xylene-2,4,6-triisocyanate; N,N′-carbonyl-biscaprolactam; N.N′-oxalybiscaprolactam; N,N′-azeloylbiscaprolactam; 1-diphenylcarbamylimidazole; 1-diphenylcarbamylpyrazole; 1-diphenylcarbamyl-1,2,4-triazole; 1-diphenylcarbamylbenzimidazole; 1-diphenylcarbamylbenzo-1,2,3-triazole; diphenyl carbonate; poly[2,2-propanebis(4-phenyl carbonate)]; diethylene glycol bis(phenyl carbonate); and polymers of the formula —$(CF_2S)_x$— where $x$ is 3000 to 6000.

The cocatalyst or polymerization promoter is used in proportions varying from about 0.15 mole percent to about 0.6 mole percent of the total lactam to be polymerized, and preferably is from about 0.2 mole percent to about 0.5 mole percent. When the cocatalyst is a polymer having repeating units the mole percent is calculated on the weight of the repeating unit.

The blowing agents are generally added to the lactam just before initiating polymerization. They should not be exposed to high temperatures in the presence of basic catalysts for extended periods because they lose gas. The blowing agents can be, for example, added to a portion of molten lactam containing the cocatalyst mixture before this portion is mixed with the portion of lactam containing the anionic catalyst, or alternatively, the two lactam portions can be mixed and then the blowing agent added thereto.

The cocatalyst can be added to the lactam containing the anionic catalyst, or equally well, the cocatalyst can be dissolved in a separate portion of the lactam and the two portions of lactam mixed before polymerization is desired. For optimum operation of the process an inert gas, such as nitrogen, is bubbled through the molten lactam during the initial reaction of the base and lactam to form the anionic catalyst, or lactam-base salt, in order to remove any low molecular weight compound formed, such as water, and in order to prevent oxidation. Alternatively, this reaction of the lactam with base can be carried out under reduced pressure in which case the low molecular weight compound is distilled from the lactam.

The process of this invention is operable in the presence of various fillers, for example, inert fillers such as reinforcing agents, calcium carbonate, clays, carbon black, etc. Usually the polymerization mix contains not more than about 60% filler based on the total composition, amounts of less than about 40% are preferred. The polymerization mixture can also contain antioxidants, plasticizers, e.g., tetramethylene sulfone, other resins, e.g., styrene, acrylic, nylon, polyether, and colorants.

The invention is illustrated by the following specific examples in which parts and percentages are by weight unless otherwise indicated.

EXAMPLES

Analytical procedures for data presented in the examples are described below.

The dilute relative viscosity $(\eta_r)_D$, is the viscosity of an 0.42 weight percent solution of the polylactam relative to the viscosity of 90% formic acid in the same viscometer (Cannon-Fenske type). The solution is filtered through a 200-mesh screen before determining the viscosity.

The vacuum extractables (percent VE) are determined by grinding the polylactam sample to 20 mesh and drying it 1 hr. at 105° C. A sample is then weighed and dried for 1 hr. at 175° C. at less than 1 mm. pressure. The percentage loss in weight of the sample gives a measure of the monomer content of the polylactam.

The swelling ratio $(W/W_0)$ is a measure of the crosslinking of the polylactam sample. It is determined by taking a 0.04 to 0.08 g. sample in the form of a cube $(W_0)$ and steeping it for 72 hrs. in 90% formic acid at room temperature. The swollen cube is removed, placed on filter paper to remove excess acid, and weighed (W). The larger the ratio of W to $W_0$ the less the crosslinking of the sample.

EXAMPLE 1

Formulation A

Two portions of ε-caprolactam amounting to 11.3 parts each are placed in separate tubes. To one tube is added 11.3 parts of dry $CaCO_3$ (Non-Fer-Al) and 0.150 part of a dispersion of NaH in mineral oil (50/50 by weight). The tube is then placed in a bath at 150° C. and sparged 10 minutes with nitrogen. Potassium stearate (0.33 part) is then added.

Into the other tube is placed 0.20 part of poly[2,2-propanebis-(4-phenyl carbonate)] ("Lexan" 105). This tube is placed in a bath at 150° C. and sparged with nitrogen for 10 minutes. N,N-diphenylformamide (0.10 part) is added. The contents of the two tubes are then combined while still heated at 150° C. and the mixture agitated for 10 seconds. A flow of nitrogen is passed over the top of the material during the foaming. The "no flow time" of the mix, i.e., the length of time after mixing when the material in the tube will no longer flow when the tube is tilted at 45°, is 30 seconds. After a total of 5.5 minutes the foamed polymer is removed from the tube. It has a bulk density of 0.69 g./cc., the vacuum extractables is 2.57%, and the solvent swelling ratio is 59.

Formulation B

Formulation B is exactly like Formulation A except that 0.4 mole percent of 2,2,4-trimethyl-3-hydroxy-3-pentenoic acid β-lactone (TMBL) is substituted for the "Lexan" 105. TMBL is injected into the contents of the second tube just prior to mixing the contents of the two tubes. Agitation in this case was with a stirrer. The foamed polymer obtained has a density of 0.67 g./cc. and a vacuum extractables of 1.54%.

EXAMPLES 2 TO 34

The procedure for these examples is the same as that described in Example 1, Formulation A or B, but substituting the blowing agents listed below.

| Example No. | Formulation No. | Blowing Agent | Quantity, Parts | Density of Foam (g./cc.) | Percent Vacuum Extractables | Swelling Ratio W/W₀ | Dilute Relative Viscosity $(\eta_r)_D$ |
|---|---|---|---|---|---|---|---|
| 2 | A | Formanilide | 0.05 | 0.65 | 2.09 | Soluble | 2.10 |
| 3 | A | N-benzylformamide | 0.10 | 0.59 | 2.00 | do | 2.55 |
| 4 | A | Triphenylmethylformamide | 0.05 | 0.80 | 2.50 | 35 | |
| 5 | A | N-2-tolylformamide | 0.05 | 0.82 | 2.08 | Soluble | 2.04 |
| 6 | A | N-formyl-p-xylidine | 0.05 | 0.80 | 2.11 | do | 2.43 |
| 7 | A | p-Nitroformanilide | 0.05 | 0.77 | 2.04 | do | 2.16 |
| 8 | A | 1-formylaminoanthraquinone | 0.10 | 0.69 | 2.01 | 69 | |
| 9 | A | N-formyl-5-chloro-o-toluidine | 0.05 | 0.77 | 1.60 | Soluble | 2.29 |
| 10 | A | N-formyl-p-aminophenol | 0.05 | 0.86 | 1.84 | do | 1.99 |
| 11 | A | N-formyl-m-phenylenediamine | 0.10 | 0.63 | 4.92 | do | 2.17 |
| 12 | A | N-formyl-p-phenylenediamine | 0.10 | 0.72 | 6.85 | do | 2.15 |
| 13 | A | N-formyl-N'-phenyl-p-phenylenediamine | 0.10 | 0.70 | 1.62 | 61 | |
| 14 | A | N-formyl-p-amino-o-toluidine | 0.10 | 0.67 | 4.51 | Soluble | 2.72 |
| 15 | A | tert-Butylformamide | 0.05 | 0.78 | 1.79 | 73 | |
| 16 | A | Anisole formate | 0.10 | 0.85 | | | |
| 17 | A | N-methylformanilide | 0.05 | 0.48 | 3.48 | 86 | |
| 18 | A | N-methylformamide | 0.10 | 0.43 | 2.97 | Soluble | 2.48 |
| 19 | A | N-ethylformanilide | 0.10 | 0.54 | 3.07 | Partly soluble | |
| 20 | B | N,N-diphenylformamide | 0.20 | 0.53 | 2.78 | do | 2.04 |
| 21 | A | N,N-diphenylformamide | 0.20 | 0.64 | 2.80 | 75 | |
| 22 | A | N,N'-diformylhexamethylenediamine | 0.10 | 0.49 | 2.97 | Partly soluble | 2.64 |
| 23 | A | N,N'-diformyl-2,5-dimethylhexamethylenediamine | 0.10 | 0.65 | 2.8 | 69 | |
| 24 | A | bis(4-formamidocyclohexyl)methane | 0.10 | 0.50 | 2.14 | Partly soluble | 2.58 |
| 25 | A | N,N'-diformyl-m-xylenediamine | 0.10 | 0.44 | 3.45 | Soluble | 2.28 |
| 26 | A | N,N'-diformyl-p-xylenediamine | 0.10 | 0.45 | 9.5 | do | 2.23 |
| 27 | A | 1,4-bis(formylamino)anthraquinone | 0.10 | 0.64 | 2.45 | 112 | |
| 28 | A | 1,5-bis(formylamino)anthraquinone | 0.10 | 0.69 | 2.57 | 92 | |
| 29 | A | 1,8-bis(formylamino)anthraquinone | 0.10 | 0.75 | 2.87 | 62 | |
| 30 | A | tert-Butyl formate | 0.10 | 0.32 | 3.40 | Soluble | 2.13 |
| 31 | A | 3,7-dimethyl-1,6-octadiene-3-yl formate | 0.05 | 0.76 | 2.50 | Partly soluble | |
| 32 | A | Benzyl formate | 0.05 | 0.78 | 2.47 | do | 2.19 |
| 33 | A | 4-formylaminoantipyrine | 0.05 | 0.78 | 2.12 | 59 | |
| 34 | A | 1,3-diphenyl-N-formyl isopropylamine | 0.05 | 0.79 | 2.12 | 50 | |

NOTE.—Where a figure occurs in the W/W₀ column, the viscosity cannot be determined because of gel particles.

EXAMPLE 35

The procedure followed was the same as that described in Example 1 except that 40 wt. percent of the caprolactam in the tube containing cocatalyst is replaced with laurolactam, and 0.20 g. N,N-diphenylformamide is used as the blowing agent. The foamed polymer has a bulk density of 0.52 g./cc., the vacuum extractables is 3.16% and the solvent swelling ratio is 46.

EXAMPLE 36

The procedure followed was the same as that described in Example 1 except that 40 wt. percent of the caprolactam in the tube containing cocatalyst is replaced by caprylolactam, and 0.20 g. N,N-diphenylformamide is used as the blowing agent. The foamed polymer has a bulk density of 0.56 g./cc., the vacuum extractables is 2.98%, and the solvent swelling ratio is 54.

EXAMPLE 37

The procedure followed was the same as that described in Example 1 except that the amounts of ingredients used was increased five-fold. The polymeriaztion mixture containing 0.50 g. N-formylhexahydrocarbazole as blowing agent is poured into a mold. A foamed polymer sheet ⅛ inch thick and having a bulk density of 0.76 g./cc. is obtained. The vacuum extractables are 1.65%, and the $(\eta_r)_D = 2.24$. A tensile strength value of 1080 p.s.i. was obtained by testing the foamed plastic sheet.

EXAMPLE 38

The procedure described in Example 37 was followed except that 0.20 g. terpinyl formate was used as the blowing agent. A foamed polymer sheet having a bulk density of 0.73 g./cc. is obtained. The vacuum extractables is 1.71%, and the $(\eta_r)_D = 2.46$.

EXAMPLE 39

The procedure described above in Example 37 was followed except that $CaCO_3$ filler was omitted and 0.50 g. N,N-diallylformamide was used as the blowing agent. A foamed polymer sheet having a bulk density of 0.67 g./cc. is obtained. The vacuum extractables is 2.45% and the solvent swelling ratio is 125.

EXAMPLES 40–49

When the blowing agent is a formamide selected from the group represented by (a) in column 2 the following are substituted for the diphenylformamide in the process as shown in Example 1 using a quantity of blowing agent equimolar to that of the diphenylformamide to give similar results.

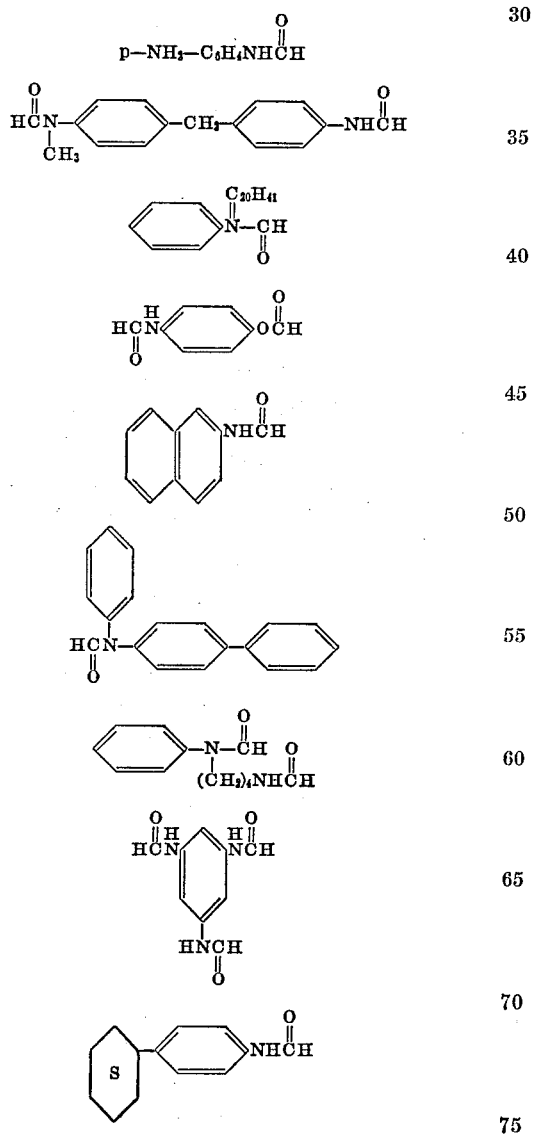

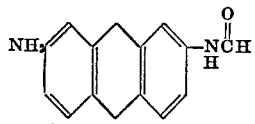

EXAMPLES 50–53

When the blowing agent is a formamide selected from the group represented by (b) in column 2 the following are substituted for the diphenyl-formamide in the process as shown in Example 1 using a quantity of blowing agent equimolar to that of the diphenylformamide to give similar results.

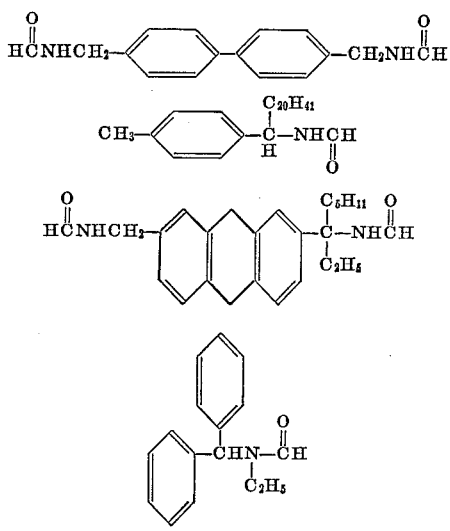

EXAMPLES 54–57

When the blowing agent is a formamide selected from the group represented by (c) in column 2 following are substituted for the diphenylformamide in the process as shown in Example 1 using a quantity of blowing agent equimolar to that of the diphenylformamide to give similar results.

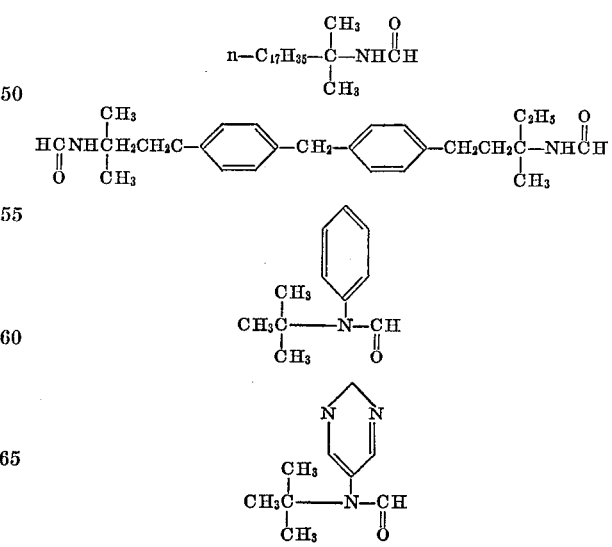

EXAMPLES 58–60

When the blowing agent is a formamide selected from the group represented by (d) in column 2 the following are substituted for the diphenylformamide in the process as shown in Example 1 using a quantity of blowing agent equimolar to that of the diphenylformamide to give similar results.

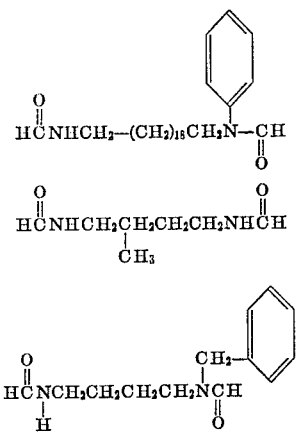

EXAMPLES 61–63

When the blowing agent is a formamide selected from the group represented by (e) in column 2 the following are substituted for the diphenylformamide in the process as shown in Example 1 using a quantity of blowing agent equimolar to that of the diphenylformamide to give similar results.

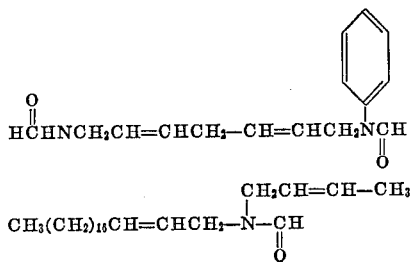

EXAMPLES 64–67

When the blowing agent is a formate selected from the group represented by (a) in column 2 the following are substituted for the diphenylformamide in the process as shown in Example 1 using a quantity of blowing agent equimolar to that of the diphenylformamide to give similar results.

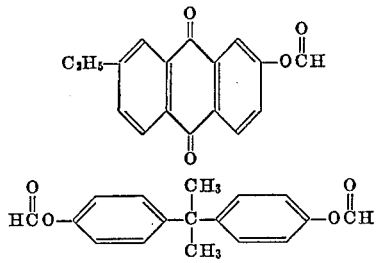

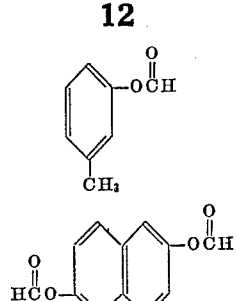

EXAMPLES 68–71

When the blowing agent is a formate selected from the group represented by (b) in column 2 the following are substituted for the diphenylformamide in the process as shown in Example 1 using a quantity of blowing agent equimolar to that of the diphenylformamide to give similar results.

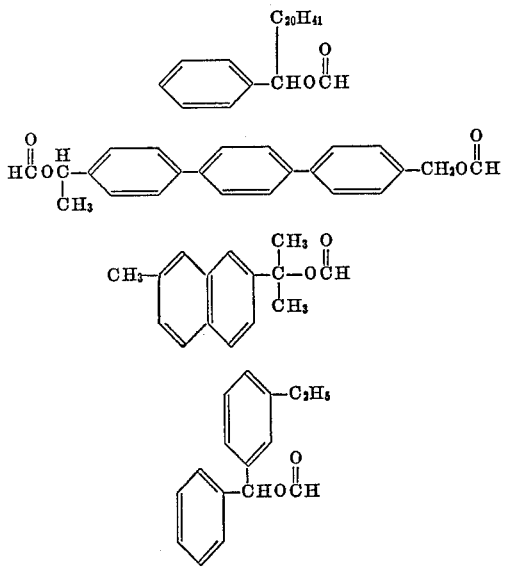

EXAMPLES 72–75

When the blowing agent is a formate selected from the group represented by (c) in column 2 the following are substituted for the diphenylformamide in the process as shown in Example 1 using a quantity of blowing agent equimolar to that of the diphenylformamide to give similar results.

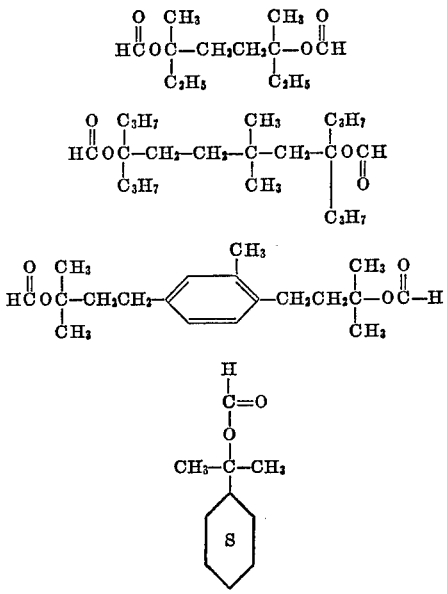

I claim:
1. In a process for making foamed polylactams which comprises heating a polymerization mixture of a lactam, a lactam-base salt, a cocatalyst capable of promoting polymerization of said lactam and a blowing agent to a temperature above the melting point of the lactam but below the melting point of the resultant polylactam thereby simultaneously polymerizing and foaming the lactam, the improvement which comprises employing a blowing agent selected from the group consisting of formates and formamides having the formula
wherein
X is 0 or

$$R-X-\overset{O}{\underset{\|}{C}}-H$$

and R represents at least one of the group consisting of:

(a) an aromatic radical having 1 to 3 rings;
(b)

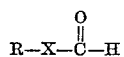

wherein Ar is an aromatic radical having 1 to 3 rings, $R^4$ and $R^5$ are hydrogen, alkyl having 1 to 20 carbon atoms, an aromatic radical having up to 7 carbon atoms and $R^3$ is hydrogen

wherein the free valence is joined to another $$-X-\overset{O}{\underset{\|}{C}}-H \text{ group}$$

or

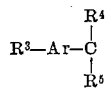

(c) a tertiary alkyl having 4 to 20 carbon atoms with the tertiary carbon bonded to X;
(d) a divalent alkylene having 4 to 20 carbon atoms and having at least 4 linear carbon atoms between valence bonds, the free valence being joined to another $$-X-\overset{O}{\underset{\|}{C}}-H$$

group;
(e) $R^6CH=CHCH_2-$ wherein $R^6$ is hydrogen, alkyl having 1 to 20 carbon atoms, and

wherein the free valence is joined to another $$-X-\overset{O}{\underset{\|}{C}}-H$$

group; and
$R^1$ represents at least one of the group consisting of hydrogen, heterocyclic having 5 to 20 carbon atoms and 1 to 3 nitrogens as the hetero atoms, alkyl having 1 to 20 carbon atoms, alicyclic having 4 to 30 carbon atoms, aromatic having 1 to 3 rings,

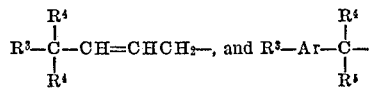

provided however, that when X is 0 it is bonded to one of the groups defined in (a), (b) or (c); and when X is

it is bonded to at least one of the groups defined in (a), (b), (c), (d) and (e) with the proviso that when

is bonded to groups (c), (d) or (e) $R^1$ is hydrogen, aromatic having 1 to 3 rings,

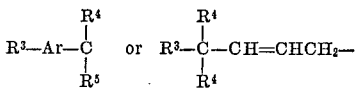

2. The process of claim 1 wherein the blowing agent is one defined in subsection (a), and wherein R is a polyvalent arylene radical having free valences joined to a plurality of

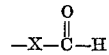

groups.

3. The process of claim 1 wherein the blowing agent is one defined in subsection (a) and wherein R and $R^1$ are aromatic radicals having a single ring.
4. The process of claim 1 wherein the blowing agent is one defined in subsection (b) wherein the Ar is a single aromatic ring.
5. The process of claim 1 wherein the blowing agent is one defined in subsection (c) and wherein R is a tertiary alkyl having from 4 to 14 carbon atoms and $R^1$ is hydrogen.
6. The process of claim 1 wherein the blowing agent is one defined in subsection (d) and wherein R is a divalent alkylene having 6 to 14 carbon atoms.
7. The process of claim 1 wherein the blowing agent is one defined in subsection (e) wherein $R^6$ is hydrogen.
8. The process of claim 1 wherein the blowing agent is the formamide N,N-diphenylformamide.
9. The process of claim 1 wherein the blowing agent is the formamide N-methylformanilide.
10. The process of claim 5 wherein the blowing agent is the formate tertiary butyl formate.
11. The process of claim 1 wherein the blowing agent is the formate 3,7-dimethyl-1,6-octadiene-3-yl formate.
12. The process of claim 1 wherein the blowing agent is the formamide bis(4-formamidocyclohexyl)-methane.
13. The process of claim 1 wherein the blowing agent is the formate benzyl formate.
14. The process of claim 1 wherein the blowing agent is the formate terpinyl formate.
15. The process of claim 4 wherein the blowing agent is the formamide N-benzylformamide.
16. The process of claim 1 wherein the blowing agent is the formamide N,N'-diformylhexamethylenediamine.
17. The process of claim 1 wherein a filler is added to the polymerization mixture.
18. The process of claim 14 wherein a filler is added to the polymerization mixture.

References Cited

UNITED STATES PATENTS 2,493,075   1/1950   La Lande.
3,236,789   2/1966   Fuller.
3,322,696   5/1967   Fisher.

SAMUEL H. BLECH, *Primary Examiner.*

MORTON FOELAK, *Assistant Examiner.*

U.S. Cl. X.R.

260—18, 30.8, 37, 78, 857

UNITED STATES PATENT OFFICE
CERTIFICATE OF CORRECTION

Patent No. 3,449,269      Dated June 10, 1969

Inventor(s) Thomas J. Hyde

It is certified that error appears in the above-identified patent and that said Letters Patent are hereby corrected as shown below:

Column 2, line 19, "grou" should read --group--; line 39, "$R_4$ and $R_5$" should read --$R^4$ and $R^5$--; line 42, "$R_1$" should read --$R^1$--; line 46, the formulas should appear as follows:

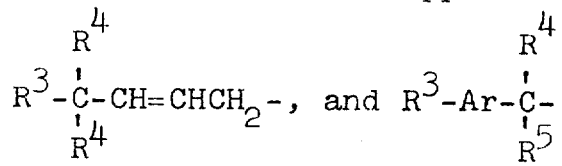

line 69, the second formula should appear as follows:

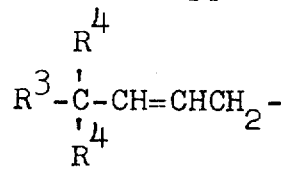

Column 4, line 63, "producting" should read --producing--; Column 5, line 6, "capylolactam" should read --caprylolactam--; Column 10, line 41, after "column 2" add --the--; Column 13, lines 12 to 20 reading "wherein
   X is O or
$$R-X-\overset{\overset{O}{\|}}{C}-H$$
and R represents at least one of the group consisting of:" should read--

wherein X is O or 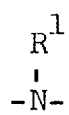 and R represents at least one of the group consisting of:--

SIGNED AND
SEALED
MAY 19 1970

(SEAL)
Attest:

Edward M. Fletcher, Jr.
Attesting Officer

WILLIAM E. SCHUYLER, JR.
Commissioner of Patents